No. 685,866. Patented Nov. 5, 1901.
D. A. REAGAN.
WATER AND STEAM TIGHT JOINT.
(Application filed Oct. 28, 1899. Renewed July 31, 1900.)
(No Model.)
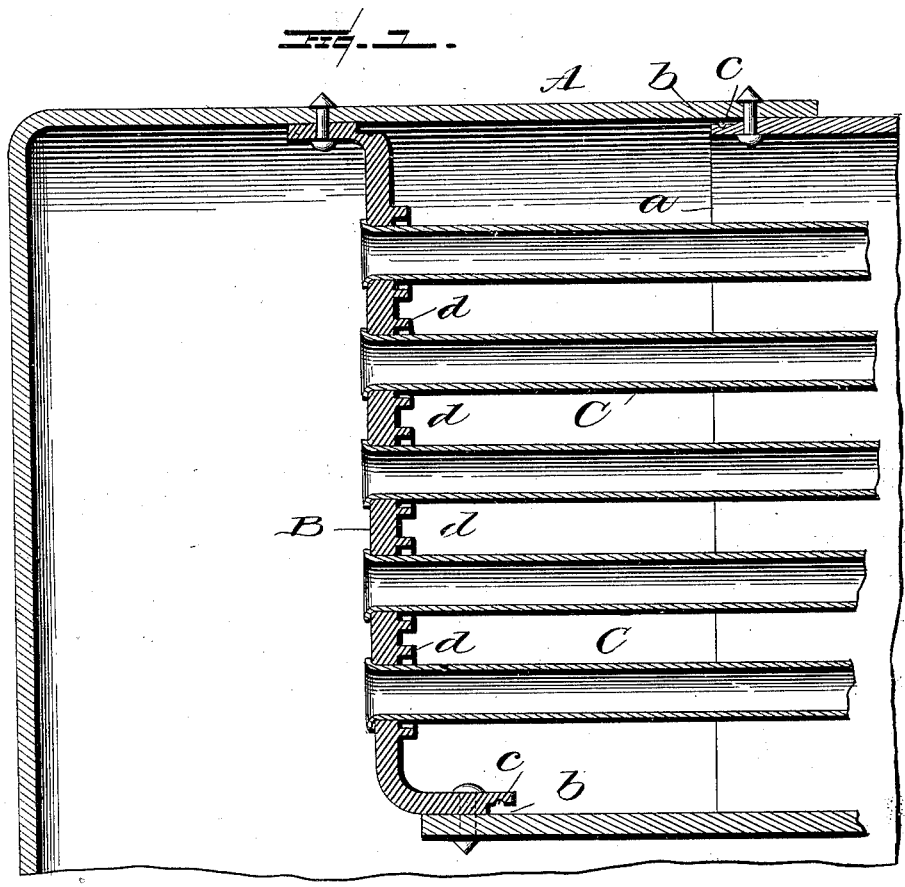
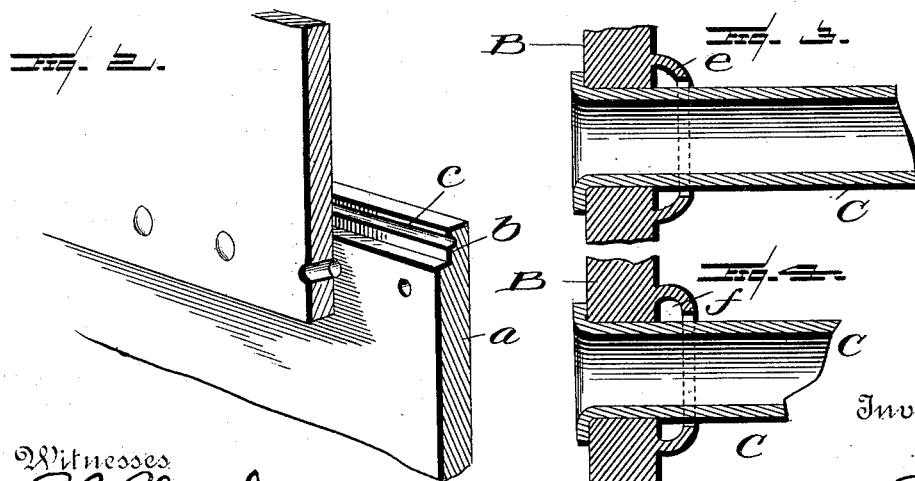
Witnesses
Ed. J. Redmond
J. P. Richards
Inventor
Dominick A. Reagan,
by W. A. Redmond
Attorney

UNITED STATES PATENT OFFICE.

DOMINICK A. REAGAN, OF ALTOONA, PENNSYLVANIA, ASSIGNOR OF ONE-THIRD TO THOMAS K. MAHER, OF ALTOONA, PENNSYLVANIA.

WATER AND STEAM TIGHT JOINT.

SPECIFICATION forming part of Letters Patent No. 685,866, dated November 5, 1901.

Application filed October 28, 1899. Renewed July 31, 1900. Serial No. 25,458. (No model.)

*To all whom it may concern:*

Be it known that I, DOMINICK A. REAGAN, a citizen of the United States, residing at Altoona, in the county of Blair and State of Pennsylvania, have invented certain new and useful Improvements in Water-Tight Joints for Boilers, Pipes, &c.; and I do declare the following to be a full, clear, and exact description of the invention, such as will enable others skilled in the art to which it appertains to make and use the same.

This invention relates to the joints of vessels or tanks, such as the overlapped joints of boilers, and to water and steam pipe joints and the joints of tubes with tube-sheets; and it has for its object to provide a simple and comparatively inexpensive device for protecting such joints from the corrosive action of the steam and water contained in, passing through, or surrounding the joints; and it consists of the parts and combinations of parts hereinafter fully described and claimed.

In the accompanying drawings, forming a part of this specification, Figure 1 is a longitudinal section through the tube-sheet and tubes of a boiler; Fig. 2, a detail perspective view of portions of boiler-plates, showing the joint; and Figs. 3 and 4 details of a portion of a tube-sheet and tubes, showing modified forms of my invention.

Similar letters refer to similar parts throughout all the views.

As is well known, it is a difficult matter to rivet the plates forming boilers or tanks and to connect tubes to tube-sheets together water-tight and that the joints thus formed are liable to open, owing to the expansion and contraction of the metal, and thus permit of leakage.

Now it is the purpose of my invention to provide against leakage resulting from defective joints or from the expansion or contraction of the metal or from whatever cause by providing means whereby the salts or calcareous matter liberated from the water may find lodgment about the joint, and thus form a cement or packing which will exclude direct contact of water therefrom.

Referring to the drawings, A represents a portion of a steam-boiler, B a tube-sheet, and C tubes having their ends expanded in openings therefor formed in the tube-sheet. While I have shown the ends of the tubes expanded in the tube, I do not desire to be restricted to such a method of securing them in place. The plates of the boiler are riveted together, as is usual, and the overlapped plate *a* in this instance is formed with a step or is rabbeted at its edge, as at *b*, in which a longitudinal groove *c* is formed, whereby the calcareous or other sediment or matter which is held in solution or suspension in the water may find its way between the plates and be deposited in the groove *c*, and thus form a packing to prevent leakage through the joint. The joint between the tube-sheet and boiler is also similarly formed. The joints formed between the tubes and the tube-sheets are similarly protected against leakage by providing a lodgment for the salts, &c., surrounding said joints. This may be accomplished in a number of ways, and in Figs. 1, 3, and 4 I show differently-formed receptacles to receive the deposit. In Fig. 1 is shown merely a circular flange *d*, formed on or otherwise secured or attached to the tube-sheet surrounding the tube-openings therein, while in Figs. 3 and 4 the recesses or receptacles, as at *e* and *f*, respectively, are bent or turned over toward the tube to render a larger space for the reception of the deposits and to insure its retention therein.

Having thus described my invention, what I claim as new, and desire to secure by Letters Patent, is—

A water and steam tight joint which consists in a receptacle adjacent to and coextensive with the joint, said receptacle forming a trap to collect and hold the salts or other matter carried in solution or suspension in water, whereby the accumulation of such salts or other matter may form a packing or cement about the joint.

In testimony whereof I affix my signature in presence of two witnesses.

DOMINICK A. REAGAN.

Witnesses:
WILLIAM S. McNELIS,
J. AUSTIN SULLIVAN.